Oct. 20, 1925.

F. G. SIMPSON 1,558,120

RADIO RECEIVING SYSTEM

Filed April 3, 1922     2 Sheets-Sheet 1

INVENTOR
Frederick Grant Simpson
BY
Fred G. Matheny
ATTORNEY

Oct. 20, 1925.

F. G. SIMPSON 1,558,120

RADIO RECEIVING SYSTEM

Filed April 3, 1922   2 Sheets-Sheet 2

INVENTOR
*Frederick Grant Simpson*
BY
*Fred G. Matheny*
ATTORNEY

Patented Oct. 20, 1925.

1,558,120

UNITED STATES PATENT OFFICE.

FREDERICK GRANT SIMPSON, OF SEATTLE, WASHINGTON.

RADIO RECEIVING SYSTEM.

Application filed April 3, 1922. Serial No. 549,056.

*To all whom it may concern:*

Be it known that I, FREDERICK GRANT SIMPSON, a citizen of the United States, residing in Seattle, county of King, State of Washington, have invented certain new and useful Improvements in Radio Receiving Systems; and I do hereby declare the following to be a full, clear, and exact description of the invention, such as will enable others skilled in the art to which it appertains to make and use the same.

The present invention relates to electrical apparatus and to the arrangement and connections thereof at the receiving station of a radio system.

The invention has for its object the provision of means of detecting and of amplifying the effect of received electro-magnetic waves upon the current in a telephone, or other, receiving circuit, thereby to increase the loudness and definition of the sounds produced by the telephone, or to increase or more clearly define the indication of other suitable receiving device, whereby more reliable communication may be established, or a greater distance of transmission made possible, the method of detecting, and amplifying the effect of said electro-magnetic waves consisting in part in utilizing energy from said electromagnetic waves to vary the frequency of an alternating current in a receiving circuit in proportion to variations in said electromagnetic waves.

The invention consists substantially in the use, construction, arrangement and circuit combinations of a generator of alternating electric current in association with other electrical circuits and with suitable electrical indicating, or sound producing devices, at a radio receiving station; wherein such electrical indicating, or sound producing, devices are actuated by variations of the frequency of the alternating current produced by such generator of alternating currents; and wherein such frequency variations are caused by variations in the dimensions of the received electro-magnetic waves as produced at a distant transmitting station. The variations in the dimensions of the electro-magnetic waves, which variations constitute the signal to be received, may be either in the length or in the amplitude of the waves, and may consist either of modulations at voice frequency, for telephonic purposes, or of an arbitrarily established code (as for example the Morse code) for telegraphic communication; all as hereinafter more particularly explained and as illustrated in the accompanying drawings and finally pointed out in the appended claims.

In a prior application, Serial No. 526,649. filed January 3, 1922, I have described and claimed a method of producing alternating, or pulsating, current in a circuit including a plurality of branches and a plurality of separate electrodes which consists in alternately connecting said electrodes with said circuit branches and supplying current successively to said electrodes by means including a gaseous conductor movable in a transverse magnetic field; I have also described and claimed various ways of varying the frequency of such alternating, or pulsating, current. In the prior application herein referred to, I have described and claimed certain devices, suitable to the accomplishment of the purpose stated in accordance with the method described, of which the device illustrated by Figure 1 and Figure 2, of the present drawings, is, with certain modifications hereinafter to be described, a particular example.

In the drawings Figure 1 is a view in elevation with parts broken away of a gas containing receptacle having mounted therein a centrally disposed cathode surrounded radially by a plurality of anodes, and an additional, cylindrical, electrode surrounding, and coaxial with, the cathode.

Figure 1:
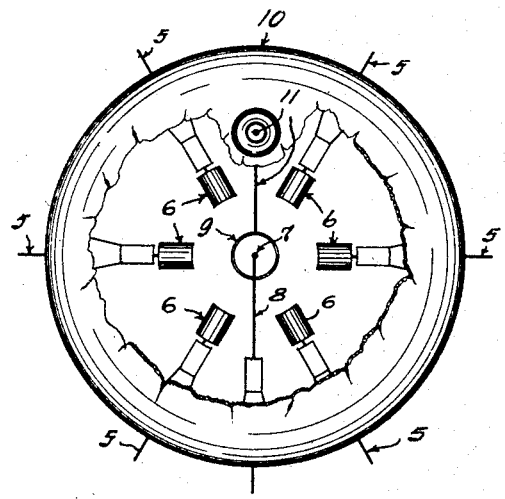
Figure 2:
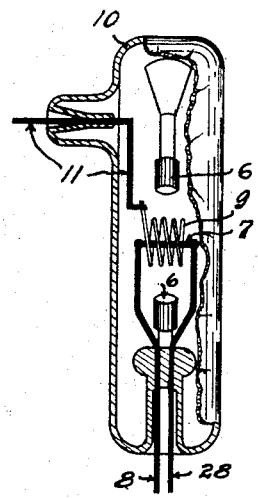
Figure 2 is a view, in partial elevation and partial section, of the same device, taken in a plane at ninety degrees from that shown in Figure 1.

In Figures 1, 2, 3 and 4; 1 is the coil of an electro-magnet having a yoke 2 and pole pieces 3 and 4; pole piece 4 is bored through, longitudinally, the longitudinal contour of the bore forming two branches of a rectangular hyperbola, that is, the curves formed by the wall of the bore in longitudinal section on any axial plane have the equation $$y = \frac{k}{x},$$

$k$ representing a constant, where the axes of reference, are the asymptotes of the curves, having their origin at the point of intersection of the axis of the cathode 7, prolonged, with the face of pole 3. The ordinates of the curve are represented, in the equation, by $x$ and the abscissæ by $y$, that is, $y$ represents the length of the magnetic air gap at any point in a radial line drawn from the cathode 7, to any of the anodes 6, where the distance of such point from the axis of the cathode is represented by $x$. 10 is a gas tight receptacle, usually of glass, in which is mounted a cathode 7, of tungsten or other suitable material capable of sustaining a temperature of incandescence under relatively low pressures of the surrounding gas; 8 and 28 are conducting terminals which lead from the cathode filament to the exterior of the receptacle 10 and are so arranged as to permit the cathode filament 7 to be connected to an external source of electric current whereby its temperature may be raised to the requisite degree; 6 are anodes, of graphite or other non-magnetic, conducting, material, which are electrically connected to suitable conductors on the exterior of the receptacle 10 by the terminal wires 5; 9 is an auxiliary electrode, of non-magnetic conducting wire wound in the form of a helix with its axis coinciding with that of the filament cathode 7; auxiliary anode 9 will hereinafter be designated as "grid 9". Grid 9 is electrically connected to the exterior of the receptacle 10 by the conducting terminal wire 11. Receptacle 10 contains a gas, which may be helium, argon, neon or other suitable gas, at a pressure which will permit a discharge of current between the cathode 7 and one of the anodes 6 in the form of a band. The proper gas pressure is determined by the kind of gas used, the distance between the cathode 7 and the anode 6, the intensity of the electric field between the cathode 7 and the anodes 6, and the material of which the cathode and anodes are made. The gas is ionized by the combined effect of the electric field between the cathode 7 and the anodes 6, and of the thermionic electron emission of the incandescent cathode 7. While the thermonic emission of the cathode 7 is not essential in the process of ionizing the gas, it being possible to attain sufficient ionization by aid of the electrc field alone, I prefer in this instance to make use of the thermionic electron emission of a heated cathode and thereby avoid the use of high differences of electric potentials between the cathode and the anode.

It is well known that it is not necessary that gases be used in the receptacle 10, and that said receptacle may be evacuated as nearly as possible. The electron band will then be, practically, entirely formed of electrons emitted by the hot cathode, which form an electron stream between the cathode 7 and anodes 6 in the manner common to vacuum tubes.

The grid 9, which is placed in relatively close proximity to the cathode 7, affords a means of introducing varying electrical potentials to the region in space which it occupies. These varying potentials cause like variations in the number of electrons emitted by the cathode and, therefore, in the electric current between the cathode and the anodes when the latter are made sufficiently positive in electrical potential with respect to the cathode.

The phenomena associated with varying grid potentials in highly evacuated tubes of the so called "audion" type are well known. In the present instance I have found it possible to secure greatly amplified variations in the current passing between the cathode 7 and the anodes 6, by impressing a variable potential upon the grid 9, with the current discharging in the form of a band which is caused to rotate about the cathode 7, by the transverse magnetic field between the magnet poles 3 and 4. The effect of such variation in the current strength is to vary, in proportional degree, the angular velocity of the rotating gaseous conducting band and, therefore, the frequency of pulsations, or alternations, of currents in circuits associated with the circuit of which the gaseous conductor between the cathode 7 and the anodes 6 is a part, as I have explained in my aforesaid prior application, Serial No. 526,649.

Due to the varying length of the air gap, between the poles 3 and 4, the gaseous conducting band will have the same angular velocity in each element of its length and will be preserved in the form of a straight band extending radially from the cathode to one of the anodes. In my prior application, Serial No. 526,649 I have shown a cylindrical bore through the pole pieces, longitudinally and have thereby attained, by careful adjustment of the gap length, uniform angular velocity of each element of the rotating gaseous conducting band. In my present application I have provided a hyperbolic bore longitudinally through one of the pole pieces for the purpose of creating a gradient of magnetic field density, extending radially from the cathode to the anodes and increasing as it approaches the anodes, the locus of which will be a hyperbola. I have thereby provided a better means of producing a correct distribution of magnetic field density, in the region between the cathode and the anodes, and have prevented the previously well known movement of the electrons and charged ions, in spiral curves about the cathode, when under the influence of a uniform transverse magnetic field.

Figure 4:
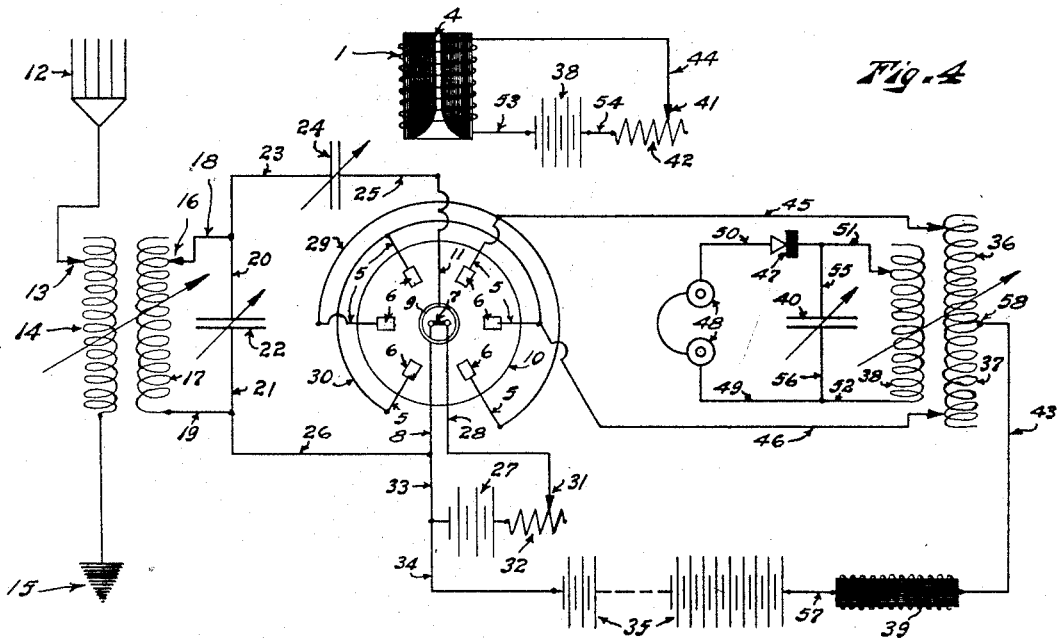
Figure 4 illustrates diagrammatically a radio telegraph, or radio telephone, receiving system in which the device, shown in Figures 2 and 3, is utilized for the production of alternating currents; and the variation of the frequency thereof in accordance with, and proportional to, variations of the dimensions of the received electro-magnetic waves.

Figure 4 shows, diagrammatically, an antenna 12 connected to the inductance coil 14 through the switch 13, one terminal of the coil 14 is connected to the ground 15, thus forming the primary circuit of a radio receiving system. The inductance coil 17 is in variable inductive association with the coil 14 and is connected in series with the variable capacitance 22 through the switch 16, and conductors 18, 20, 21 and 19, thereby forming the secondary circuit of the radio receiving system. The point of electrical connection between the conductors 18 and 20 in the radio secondary circuit is connected to the variable condenser 24, by means of the conductor 23, the other terminal of the condenser 24 is connected to the grid 9 through its terminal 11 and the conductor 25. The point of electrical connection between the conductors 19 and 21 in the radio secondary circuit is connected through the conductor 26 to the terminal 8 of the cathode 7, which is also connected to the negative terminal of the battery 27 by means of the conductor 33. The other terminal 28 of the cathode 7 is connected through the switch 31 to the variable resistance 32, the other terminal of which is connected to the positive terminal of the battery 27. Anodes 6 are alternately connected together through their terminals 5 to the conductors 29 and 30, thereby forming two groups of anodes of which the conductors 29 and 30 are the respective terminals. Cathode 7, anodes 6 and grid 9 are contained within the gas tight receptacle 10 which also contains a gas of proper kind and pressure, as has been hereinabove, or in my aforesaid application Serial No. 526,649, explained.

Figure 3:
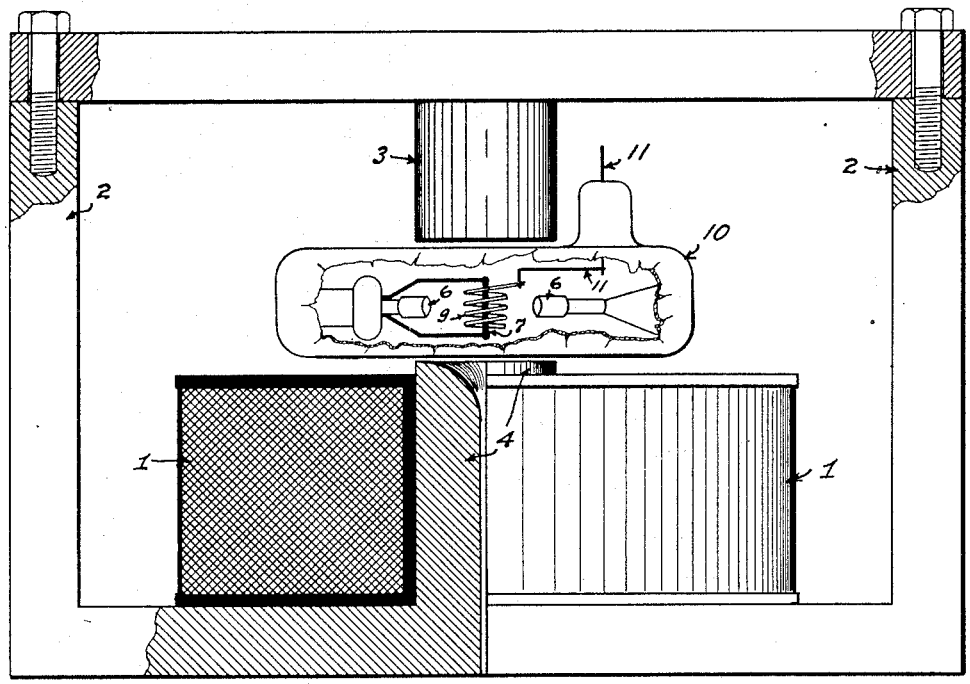
Figure 3 is a view, in partial elevation and partial section showing the same device mounted between the poles of an electro-magnet.

In the diagram, Figure 4, it is indicated that the receptacle 10 is mounted in a transverse magnetic field, in the manner shown in Figure 3, by the pole piece 4 around which is wound the coil 1. The other parts of the magnet have been omitted for greater simplicity. The terminals of the coil 1 are connected by means of the conductors 44, 54 and 53 through the switch 41 and variable resistance 42 to the terminals of the battery 38 which supplies current to the exciting coil 1 of the electro-magnet which creates the aforesaid magnetic field.

The inner terminals of coils 36 and 37, which are inductively coupled together, are joined at the point 58. The outer terminals of coils 36 and 37 are variably connected, by means of conductors 45 and 46 respectively, to the anode group terminals 29 and 30 respectively. The common terminal 58, of the inductance coils 36 and 37, is connected by means of the conductor 43 through the combined resistance and reactance 39 and conductor 57 to the positive terminal of the battery 35, the negative terminal of which battery is connected by means of conductors 34 and 33 to the terminal 8 of the cathode 7. Inductance coil 38 is associated by variable inductive coupling, with coils 36 and 37 and is connected in series with the variable capacitance 40 by means of conductors 51, 52, 55 and 56; and also in series with the telephone receiver (or other suitable electrical indicating device) 48, through the current rectifier 47, by means of the conductors 51, 50, 52 and 49.

Figure 5:
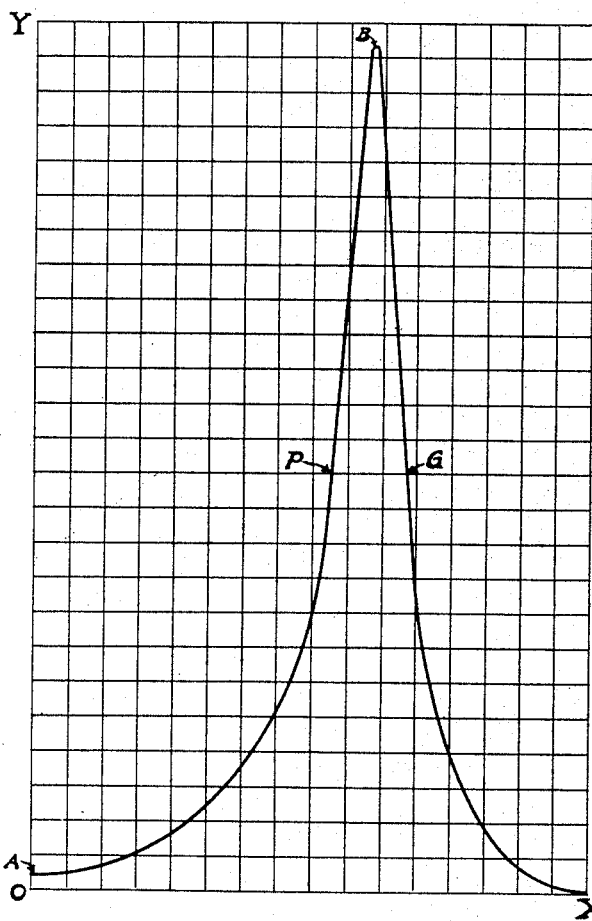
Figure 5 is a conventional resonance curve, depicting variations in the effective values of the current in one of the circuits shown in the diagram as caused by variations of the frequency of such current.

In Figure 5 the curve A P B G X is a part of the graph of any alternating current in the circuit consisting of coil 38, conductors 51, 52, 55 and 56 and condenser 40; which circuit is associated (by capacitance and resistance coupling through the common condenser 40 and the resistance of the common conductors 55 and 56) with the circuit consisting of the telephone receiver 48, rectifier 47, condenser 40 and conductors 55, 56, 49 and 50; in which the part of the graph shown is drawn between limits of the frequency, of such alternating current, which include the frequency to which, at some predetermined value of inductance, capacitance and resistance, the circuit herein defined is resonant and, therefore, to which it offers minimum impedance. In the figure the ordinates, having axis O—Y, represent squared effective values of the current in the circuit; the abscissæ, having axis O—X, represent the frequency of the current. The abscissa at the point B on the curve, represents the frequency to which the circuit is resonant.

Referring to Figure 4, let it be assumed that current from the battery 27, as regulated by the variable resistance 32, is flowing in the cathode 7. If it also be assumed that the current in the cathode is sufficiently large to heat it to a temperature of incandesence and if a difference of electrical potential is established between the cathode 7 and the anodes 6 by means of the battery 35, which is connected between the anodes and the cathode as hereinabove describd, the gas in the receptacle 10 will become ionized by the action of the thermal agitation of the cathode, which will cause it to emit negative charges, or electrons, the velocity of which will be accelerated, as they pass from the cathode to the anodes due to the gradient of the electric field through which they fall. As is well known, increased ionization of the gas will be caused by the collision of these electrons with the gas molecules, or atoms, the resultant stream of negative charges passing to the anodes and positive charges passing to the cathode constituting an electric current. The current stream may, by proper adjustment of the electrical potentials applied to the cathode and the anodes, be concentrated in the form of a band extending from the cathode to one of the anodes. If, now, the current stream be subjected to the influence of a transverse magnetic field, the density of which increases, hyperbolically, along radial lines from cathode to anodes, which is produced by current from the battery 38, as regulated by the variable resistance 42, in the magnet exciting coil 1; it will rotate about the cathode 7, successively engaging anodes 6 and creating pulses of current through the coils 36 and 37, alternately, and alternating current in the circuit consisting of coil 38, condenser 40 and conductors 51, 52, 55 and 56, which is coupled to coils 36 and 37; as I have described in my prior application hereinbefore mentioned. The frequency of the alternating current may be increased to a point above audibility by increasing the current in the magnet exciting coil 1, by lowering the resistance of the variable resistance 42, and thereby increasing the intensity of the transverse magnetic field and consequently the angular velocity of the rotating gaseous conductor; or by any other method described in my aforesaid prior application.

If the frequency of which circuit 38—51—55—40—56—52 is resonant is that indicated by point B, of the curve in Figure 5; and if the frequency generated by the rotating gaseous conductor, in the receptacle 10, is that indicated by point P, or by point G, of the curve mentioned, it is manifest that a comparatively slight variation of the frequency generated by the rotating gaseous conductor will produce large variations in the current flowing in the circuit 38—51—55—40—56—52 and therefore corresponding variations in the rectified current flowing in the coupled circuit 40—55—47—50—48—49—56—. Such current variations will actuate the telephone receiver (or other indicating device) 48.

Let it be assumed that a distant radio transmitting station is radiating continuous electro-magnetic waves. If the receiving antenna or primary circuit 12—13—14—15, and the radio secondary circuit 17—19—21—22—20—18—16, of Figure 4, be adjusted to resonance at the frequency of such radiated waves, by adjusting the capacitance or inductance, or both, in such circuits; and if the coupling between coils 14 and 17 is adjusted to a point of maximum efficiency; the manner of doing all of which is well known; a current of maximum amplitude, under the conditions stated, will flow in the radio secondary circuit. Positive and negative differences of potential of the frequency of the current in the radio secondary circuit will be alternately impressed between the grid 9 and the cathode 7 by means of the conductor 23, condenser 24, conductor 25, grid terminal 11, conductor 26, and cathode terminal 8. These alternating potential differences will produce variations, of the same frequency, in the current in the gaseous conducting band between the cathode and the anodes.

The angular velocity of the rotating gaseous conductor, as measured by the frequency of the current pulsations in the coils 36 and 37, may be regarded for practical purposes, as constant, so far as the frequency of the radio frequency potentials are concerned, and as proportional to the mean current value in the gaseous conducting band. Let the frequency indicated by point P, of the curve in Figure 5, be the frequency of the current in coil 38, due to its inductive coupling to coils 36 and 37, under the conditions stated. Let it now be assumed that the distant radio transmitting station transmits signals by varying or modulating the amplitude of the electromagnetic waves at audio frequency. Like variations in the differences of potential between the grid 9 and the cathode 7 will be produced through the medium of similar variations in the values of the currents flowing in the radio receiving primary and secondary circuits. The potential variations of the grid and cathode will, in turn, produce like variations of the current in the gaseous conducting band, and, therefore, in its angular velocity of rotation and, consequently, in the frequency of the pulsations of the current in coils 36 and 37 and of the alternating current in coil 38.

As I have hereinbefore shown, the relatively slight variations of the frequency above or below that indicated by the point P, in the circuit 38—51—55—40—56—52, will produce large variations in the current therein and, therefore, in the coupled circuit 40—55—47—50—48—49—56. The diaphragm of the telephone receiver (or mechanism of other suitable indicating or recording device) 48 responds in direct proportion to the variation in the current by which it is actuated, or in direct proportion to the energy variation represented by such current variation; therefore the signal transmitted from the distance radio transmitting station is reproduced by the telephone receiver in the form of sound, or by other suitable devices in the energy form characteristic of such devices.

If the distant radio transmitting station transmits signals by varying or modulating the length of the previously transmitted continuous waves, the result will be exactly the same as in the preceding case. The radio receiving primary and secondary circuits which are adjusted to be resonant at the frequency of the previously transmitted continuous wave will offer relatively high impedance to currents of any other frequency. If the modulations are all at frequencies above the resonance frequency of the circuits mentioned, or if they are all at frequencies below the resonance frequency, there will be a variable reduction in the value of the current in the circuit, which will be communicated, through the medium of grid 9, to the rotating gaseous conductor and converted into like variations in the frequency, and therefore in the strength of the current, in the receiver circuit containing the telephone receiver (or other suitable device) 48. If the modulations are at frequencies both above and below the frequency to which the radio receiving primary and secondary circuits are resonant, it is best to readjust these circuits so that they shall be resonant to a frequency just without the range of modulated frequencies.

If the distant radio transmitting station transmits signals by radiating groups of damped waves or groups of undamped waves, each group of waves consisting of a number of shorter groups of waves, as is done in transmitting telegraphically, by means of Morse signals, with radio spark or interrupted undamped wave transmitters; such signals will be received and amplified in very much the same manner as that previously herein described in connection with signals, or voice modulations, carried by uninterrupted continuous waves. In the case of the wave group signals, there will be no change in the angular velocity of the rotating gaseous conductor due to an unmodulated stream of waves arriving at the receiving station, as there will, of course, be no such stream of waves. The point P on the curve in Figure 6 will in the latter case represent the frequency produced by the locally determined angular velocity of the rotating gaseous conductor which will be varied by the incoming signal at the group frequency of each of the longer groups of wave trains. Such variations will be communicated to the telephone receivers (or other suitable device) 48 in the manner hereinbefore described.

While I have shown and described a certain form of apparatus and arrangement of electrical circuits, at a radio receiving station, my invention is not to be limited to the particular form of apparatus or arrangement of circuits illustrated as it will be apparent that many modifications in the shape and arrangement of the various parts may be made without departing from the scope of the appended claims. It will also be apparent that this invention may be utilized for other purposes than those shown and described.

What I claim as new and desire to secure by Letters Patent of the United States is:

1. The method of converting energy in the form of electromagnetic waves to energy in a form perceptible to the sense organs of the human body, which consists in part in generating alternating current by the movement of electrons in a magnetic field and in utilizing said electromagnetic waves to vary the velocity imparted to said electrons by said magnetic field thereby varying the frequency of said alternating current.

2. The method of converting energy in the form of electromagnetic waves to energy in a form perceptible to the sense organs of the human body, which consists in generating an alternating current by the rotation of an electronic stream in a magnetic field and in utilizing the energy of said electromagnetic waves to vary the velocity of rotation of said electronic stream whereby the frequency of said alternating current will be varied.

3. The method of converting energy in the form of electromagnetic waves to energy in a form perceptible to the sense organs of the human body, which consists in part in generating an alternating current by the movement of an electronic stream in a magnetic field and in utilizing said electromagnetic waves to vary the velocity of movement of said electronic stream thereby varying the frequency of said alternating current, said variations in frequency being proportional to and caused by variations in the energy represented by said electromagnetic waves.

4. In apparatus for detecting and amplifying signals in the form of variations in the dimensions of electromagnetic waves, means for intercepting said electromagnetic waves, a generator of alternating current embodying an electronic stream movable in a transverse magnetic field and means for utilizing the energy of said electromagnetic waves to vary the velocity imparted to said electronic stream by said magnetic field thereby varying the frequency of said alternating current generator.

5. Means for utilizing an alternating current generator having a transverse moving electronic stream and in which the frequency of the current generated is a function of the transverse velocity of said electronic stream, for detecting and amplifying variations in the form of, or amount of, energy as represented by electromagnetic waves, wherein such variations consists of interruptions in the continuity of such electromagnetic waves, whereby such variations are made to produce variations of energy in a form perceptible to the sense organs of the human body, embodying devices for utilizing the electromagnetic waves to vary the transverse velocity of the electronic stream of said alternating current generator, thereby varying the frequency of said alternating current generated.

6. Means for detecting and amplifying variations in the form of, or amount of energy as represented by, electromagnetic waves, by the use of an alternating current generator having a rotating electronic stream, the velocity of rotation of which determines the frequency of said generator, to produce variations of energy of a form perceptible to the sense organs of the human body, embodying means for utilizing the variations of said electro-magnetic waves to vary the velocity of rotation of said rotating electronic stream of said generator to thereby produce a change in the previously existing frequency of said generator, proportional to such variations in such electromagnetic waves, and means for utilizing such change of alternating current generator frequency to produce a corresponding change in the current in an electric circuit supplied with current by such alternating current generator.

7. Means for detecting and amplifying variations in the form of, or amount of energy as represented by electro-magnetic waves by the use of an alternating current generator, having a transverse moving electron stream and in which the frequency of the generator is a function of the transverse velocity of the moving electron stream, to produce variations of energy of a form perceptible to the sense organs of the human body, embodying means for utilizing variations in said electro-magnetic waves to vary the transverse velocity of the moving electron stream of said generator and to thereby produce a change in the previously existing frequency of said generator, proportional to such variations in such electromagnetic waves, an electrical circuit supplied with current by such alternating current generator, and electrical current operated devices associated with such circuit and actuated by changes in said current.

8. Means for detecting and amplifying a signal in the form of interruptions in the continuity of a train of electromagnetic waves embodying an alternating current generator having a moving electron stream and in which the frequency of the generator is a function of the transverse velocity of said moving electron stream, and means for utilizing said electro-magnetic waves to vary the transverse velocity of said moving electron stream of said alternating current generator to thereby produce a change in the frequency of the alternating current generated thereby such change being caused by, and proportional to, the interruptions in the continuity of such electromagnetic waves train.

9. Means for detecting and amplifying variations in the effect of electromagnetic waves embodying a primary receiving circuit for intercepting said electromagnetic waves, a secondary receiving circuit arranged to receive therefrom an induced current that varies in proportion to the variations in said electromagnetic waves, an alternating current generator having a transverse moving electron stream, the velocity of which determines the frequency of said generator, means for utilizing said induced current to vary the frequency of said alternating current generator by varying the transverse velocity of said moving electron stream and to thereby vary the current from said alternating current generator into energy variation in a form perceptible to the sense organs of the human body.

10. Means for detecting and amplifying the effect of, variations in electromagnetic waves, embodying receiving circuits, an alternating current generator including a moving gaseous conductor band and means for utilizing energy represented by said electromagnetic waves to vary the frequency of said alternating current generator by varying the current in said gaseous conductor band, and thereby varying the velocity of said conductor band.

11. Means for detecting and amplifying the effect of variations in electromagnetic waves, embodying an alternating current generator having a plurality of electrodes and arranged to have a gaseous conductor band move between said electrodes, means for producing a magnetic field at substantially right angles to said gaseous conductor band, and means for utilizing energy represented by said electromagnetic waves to vary the angular velocity of said gaseous conductor band and to thereby vary the frequency of said alternating current generator.

12. The method of varying the frequency of an alternating current generator wherein the alternations of current are produced by a gaseous conductor band arranged to rotate in a transverse magnetic field between a single cathode and a plurality of spaced anodes, which consists in varying the velocity of said band by impressing a variable electric potential generated by intercepted electromagnetic waves in the region between said cathode and said anodes.

13. Radio receiving devices including cirsuits so arranged as to intercept electromagnetic waves and to convert energy represented by such electromagnetic waves into energy in the form of an electric current, an alternating current generator having a rotating electron stream, means for varying the frequency of such alternating current generator by utilizing variations of the current in such circuits to vary the angular velocity of said rotating electron stream of said generator and means for detecting variations of the frequency of such alternating current generator.

14. Radio receiving devices including, circuits so arranged as to intercept electromagnetic waves and to convert energy represented by said electromagnetic waves into energy in the form of an electric current, an alternating current generator having a moving part, the velocity of which determines the frequency of said generator, means for varying the frequency of such alternating current generator by utilizing variations of the current in said circuits to vary the velocity of said moving part, another circuit containing inductance and arranged to be supplied with current by said alternating current generator and means for detecting variations of the current in said last named circuit.

15. Radio receiving devices including circuits so arranged as to intercept electromagnetic waves and to convert energy represented by said electromagnetic waves into energy in the form of an electric current, an alternating current generator having an electronic stream arranged to rotate in a transverse magnetic field, the velocity of rotation of said electronic stream determining the frequency of said generator, means for utilizing variations of the current in said circuits to vary the angular velocity of said rotating electronic stream, another circuit capable of adjustment to be resonant at a predetermined frequency and arranged to be supplied with current by said alternating current generator and means for detecting variations of the current in said last named circuit.

16. In radio receiving apparatus an alternating current generator embodying in part, a gaseous conductor band arranged to rotate in a transverse magnetic field between a single cathode and a plurality of anodes, a grid surrounding said cathode, means for supplying electric current to said cathode, a primary radio receiving circuit for intercepting electromagnetic waves, a secondary radio receiving circuit, connected with said grid whereby differences of potential will be impressed between said grid and said cathode to vary the current in said gaseous conductor band, and means for converting the variable alternating current delivered by said generator into variations of energy of a form perceptible to the sense organs of the human body.

17. In radio receiving apparatus, a current generator embodying a moving electron stream, the angular velocity of which determines the frequency of the generator, means governed by variations in intercepted electromagnetic waves for varying the angular velocity of said electron stream to vary the frequency of pulsations of current delivered by said generator, a primary circuit connected with said generator, a secondary circuit coupled to said primary circuit and arranged to receive an alternating current therefrom, a receiving circuit coupled to said secondary circuit and means in said receiving circuit for rendering the variation of energy therein perceptible to the sense organs of the human body.

18. In radio receiving apparatus, a current generator embodying a moving electron stream, the transverse velocity of which determines the frequency of the generator, means governed by variations in intercepted electromagnetic waves for varying the transverse velocity of said electron stream to vary the frequency of pulsations of current delivered by said generator in proportion to variations in said electromagnetic waves, a primary circuit connected with said generator, a secondary circuit arranged to receive an alternating current from said primary circuit, means for adjusting the natural period of oscillation of said circuits, and means for rendering variations of energy in said secondary circuit perceptible to the sense organs of the human body.

19. Means for producing a succession of current impulses in a circuit embodying a plurality of separate electrodes, an electromagnet having poles shaped to form a gap between them the length of which varies in accordance with the equation of a rectangular hyperbola, means including a gaseous conductor rotating in the magnetic field produced between the poles of said magnet for supplying current successively to said electrodes, the density of said magnetic field being distributed so as to produce equiangular velocity of each element of said gaseous conductor.

20. Means for producing variations in the frequency of a succession of current impulses embodying a plurality of separate electrodes, circuits connected with said electrodes, an electromagnet, a generator including in part a gaseous conductor rotating in the field of said electromagnet for supplying current successively to said electrodes, and an additional electrode disposed in the path of said gaseous conductor and arranged to have potentials impressed thereon to vary the velocity of said gaseous conductor.

21. A converter of electric current embodying a gas tight housing, a centrally disposed electrode of one polarity, a plurality of electrodes of opposite polarity arranged around said central electrode, circuit means connected with all of said electrodes for producing a gaseous conductor band between said central electrode and said other electrodes, means for producing a magnetic field at right angles to the normal path of electrical discharge between said central electrode and said other electrodes, to rotate said gaseous conductor band, and a grid disposed between said central electrode and said other electrodes and arranged to have varying potentials impressed thereon to vary the velocity of said gaseous conductor band.

22. A converter of electric current embodying a gas tight housing, a centrally disposed electrode of one polarity in said housing, a plurality of spaced electrodes of opposite polarity disposed radially around said central electrode, terminal means connected with all of said electrodes and magnet poles disposed at right angles to the common plane of said electrodes, said magnet poles being so shaped as to form a gap between them the length of which varies in accordance with the equation of a rectangular hyperbola.

23. The method of producing rotation of a gaseous conductor band about an electrode, which consists in subjecting said conductor band to the action of transverse magnetic field the intensity of which varies directly in proportion to the distance from said electrode measured along the line of said gaseous conductor band.

24. In a converter of electric current, a gas tight housing, an electrode of one polarity, a plurality of electrodes of opposite polarity arranged around said first named electrode, means for producing an electron stream between said first named electrode and said last named electrodes and means for producing a magnetic field, transverse to said electron stream, the intensity of which varies directly in proportion to the radial distance from said first named electrode measured along the line of said electron stream.

25. The method of producing rotation of an electron stream about an electrode, which consists in subjecting said electron stream to the action of a transverse magnetic field the intensity of which varies directly in proportion to the distance from said electrode measured along the line of said electron stream.

FREDERICK GRANT SIMPSON.